(12) United States Patent
Nakayama et al.

(10) Patent No.: US 12,296,548 B2
(45) Date of Patent: May 13, 2025

(54) METHOD FOR MANUFACTURING TUBE BODY MADE OF FIBER-REINFORCED RESIN

(71) Applicant: Hitachi Astemo, Ltd., Ibaraki (JP)

(72) Inventors: Takahiro Nakayama, Ibaraki (JP); Kenichi Mori, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 153 days.

(21) Appl. No.: 17/932,525

(22) Filed: Sep. 15, 2022

(65) Prior Publication Data
US 2023/0173771 A1    Jun. 8, 2023

Related U.S. Application Data

(63) Continuation of application No. PCT/JP2020/025393, filed on Jun. 26, 2020.

(51) Int. Cl.
| | | |
|---|---|---|
| B29C 70/44 | (2006.01) | |
| B29C 70/32 | (2006.01) | |
| B29C 70/54 | (2006.01) | |
| B29K 307/04 | (2006.01) | |
| B29L 23/00 | (2006.01) | |

(52) U.S. Cl.
CPC ........ B29C 70/541 (2013.01); *B29K 2307/04* (2013.01); *B29L 2023/00* (2013.01)

(58) Field of Classification Search
None
See application file for complete search history.

(56) References Cited

U.S. PATENT DOCUMENTS

2005/0258575 A1    11/2005  Kruse et al.

FOREIGN PATENT DOCUMENTS

| | | |
|---|---|---|
| CN | 1492801 A | 4/2004 |
| CN | 104494160 A | 4/2015 |
| DE | 69424047 T2 | 9/1995 |
| EP | 0700775 A1 | 3/1996 |
| EP | 1368179 B1 | 12/2003 |
| JP | H03-265738 A | 11/1991 |
| JP | H06-47822 A | 2/1994 |
| JP | H06-270268 A | 9/1994 |
| JP | H08-323870 A | 12/1996 |

(Continued)

OTHER PUBLICATIONS

Machine Translation of EP 1368179-B1 (Year: 2005).*

(Continued)

*Primary Examiner* — Robert J Grun
(74) *Attorney, Agent, or Firm* — KENEALY VAIDYA LLP (57) ABSTRACT

A method for manufacturing a tube body made of fiber-reinforced resin includes: an arranging step of arranging a fiber member on an outer peripheral surface of a mandrel made of resin by filament winding method; an inflating step of placing the mandrel with the fiber member arranged on it in a mold after the arranging step and inflating the mandrel by pressurizing an interior of the mandrel with the fiber member arranged on it; and a molding step of supplying resin in the mold after the inflating step to impregnate the fiber member with the resin and curing the impregnated resin to mold a tube body.

19 Claims, 11 Drawing Sheets

(56) References Cited

FOREIGN PATENT DOCUMENTS

JP          2003-127257  A     5/2003
WO          2021/260953  A1    12/2021

OTHER PUBLICATIONS

Office Action for the related German Patent Application No. 112020006763.7 dated Feb. 9, 2024.
International Search Report and Written Opinion of the International Search Report for PCT/JP2020/025393 dated Sep. 24, 2020.
Japanese Office Action (Decision to Refusal) for the related Japanese Patent Application No. 2020-542673 dated Sep. 15, 2020.
Japanese Written Opinion for the related Japanese Patent Application No. 2020-542673 dated Nov. 16, 2020.
Japanese Written Amendment for the related Japanese Patent Application No. 2020-542673 dated Nov. 16, 2020.
Chinese Office Action for the related Chinese Patent Application No. 202080099790.7 dated Dec. 23, 2024.

\* cited by examiner

UPPER ← → LOWER

FIG. 4

UPPER ← → LOWER

METHOD FOR MANUFACTURING TUBE BODY MADE OF FIBER-REINFORCED RESIN

CROSS-REFERENCE TO RELATED APPLICATIONS

This application is a continuation application based on PCT/JP2020/025393, filed on Jun. 26, 2020, the contents of which are incorporated herein by reference.

TECHNICAL FIELD

The present invention relates to a method for manufacturing a tube body made of fiber-reinforced resin that is used, for example, as a power transmission shaft of a vehicle.

RELATED ART

A power transmission shaft (propeller shaft) mounted in a vehicle includes a tube body extending in a front-rear direction of the vehicle, and transmits power that is generated by a prime mover and decelerated by a speed reducer to a final reduction gear by means of the tube body. As a tube body used in such a power transmission shaft, there is known a tube body made of fiber-reinforced resin that is manufactured using a mandrel (see JP H03-265738 A).

In contrast, JP 2003-127257 A describes, as a method for wrapping a material around a mandrel, a method for wrapping a resin-impregnated fiber member around a mandrel by filament winding method and then curing the resin-impregnated fiber member by autoclave treatment. JP H08-323870 A also describes that a fiber member in which resin has not been impregnated is wrapped around a mandrel, followed by impregnating the fiber member with resin in a mold.

The technology described in JP H08-323870 A has a risk that the fiber member may bite into the mold. If clearance is kept in the mold to prevent the fiber member from biting into the mold, the amount of resin supplied to the fiber member is increased by the amount of the clearance, so that the weight of the tube body as a finished product may increase accordingly.

The present invention has been made to solve this problem. An object of the present invention is to provide a method for manufacturing a tube body made of fiber-reinforced resin, by which an increase in the weight of the tube body can be suppressed while ensuring clearance in the mold.

SUMMARY OF THE INVENTION

To solve the above problem, the present invention provides a method for manufacturing a tube body made of fiber-reinforced resin comprising: an arranging step of arranging a fiber member on an outer peripheral surface of a mandrel made of resin by filament winding method; an inflating step of placing the mandrel with the fiber member arranged on it in a mold after the arranging step and inflating the mandrel by pressurizing an interior of the mandrel with the fiber member arranged on it; and a molding step of supplying resin in the mold after the inflating step to impregnate the fiber member with the resin and curing the impregnated resin to mold a tube body.

According to the present invention, clearance is ensured when a mandrel on which a fiber member is arranged is placed in a mold, and it is possible to prevent the fiber member from biting into the mold. Further, the inflated (expanded) shape of the mandrel can be suitably set in accordance with the inner shape of the mold, and an increase in the weight of the tube body can be suppressed while preventing an increase in the amount of resin used in the finished product of the tube body made of fiber-reinforced resin.

DETAILED DESCRIPTION OF THE INVENTION

Embodiments of the present invention will be described in detail with reference to the drawings, in which embodiments a power transmission shaft (propeller shaft) of a vehicle is manufactured using carbon fiber-reinforced plastic as a tube body made of fiber-reinforced resin. In the following description, the same or similar components are denoted by the same reference numerals and redundant explanations thereof are omitted. It should be noted that the drawings referred to are deformed for the purpose of clarity and the shape, dimensions, etc. of each of the components are not accurately represented in the drawings.

First Embodiment

<Tube Body>

Figure 1:
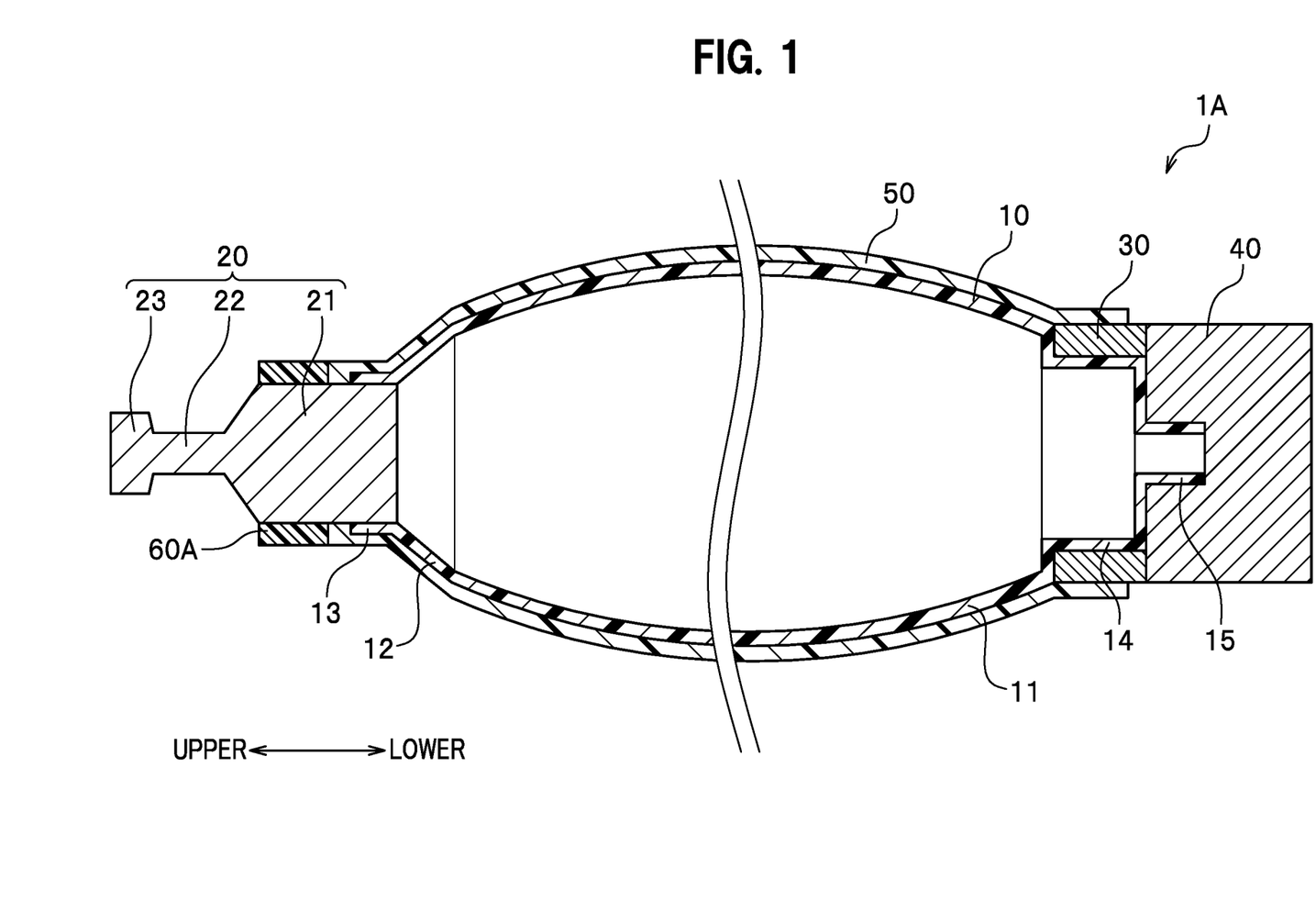
FIG. 1 is a cross-sectional view schematically showing a tube body made of fiber-reinforced resin according to a first embodiment of the present invention.

As seen in FIG. 1, a tube body made of fiber-reinforced resin (hereinafter simply referred to as a "tube body") 1A according to a first embodiment of the present invention includes a mandrel 10, a first connecting member 20, a second connecting member 30, a third connecting member 40, a resin-containing fiber layer 50, and a resin layer 60A. In other words, the tube body 1A is composed of the resin-containing fiber layer 50 and the resin layer 60A. The first connecting member 20, the second connecting member 30, and the third connecting member 40 are connected to the tube body 1A. The mandrel 10 is a core material of the tube body 1A.

<Mandrel>

The mandrel 10 is a member made of resin that has a tubular shape. In this embodiment, the mandrel 10 serves as a core material of the tube body 1A. The mandrel 10 may be made of a material that can withstand heating during the resin curing process for the resin-containing fiber layer 50. The mandrel 10 is made, for example, of a material such as PP (polypropylene resin), PET (polyethylene terephthalate resin), and SMP (shape memory polymer). The mandrel 10 integrally includes a large diameter portion 11 at an axial middle portion thereof, a tapered portion 12 and a medium diameter portion 13 that are formed at one axial end portion thereof, and a stepped portion 14 and a small diameter portion 15 that are formed at the other axial end portion thereof. Before the tube body 1A is manufactured, the large diameter portion 11 of the mandrel 10 has a cylindrical shape having the same diameter throughout the entire length in its axial direction (see FIG. 3). After the tube body 1A is manufactured, the large diameter portion 11 of the mandrel 10 has a barrel shape that expands radially in the axial middle portion. In other words, the outer diameter of the mandrel 10 reduces from the axial middle portion toward the axial end portions.

<First Connecting Member>

The first connecting member 20 is a columnar member inserted into and connected to one axial end portion of the mandrel 10. In this embodiment, the first connecting member 20 is a stub shaft made of metal. The first connecting member 20 has a large diameter portion 21, a small diameter portion 22, and a medium diameter portion 23 that are formed integrally and arranged in this order from the mandrel 10 side. The large diameter portion 21 is partly inserted into the medium diameter portion 13 of the mandrel 10. The small diameter portion 22 and the medium diameter portion 23 are exposed from the mandrel 10. An external gear formed on the outer peripheral surface of the large diameter portion 21 meshes with an internal gear formed on the inner peripheral surface of the medium diameter portion 13 of the mandrel 10. This can regulate a circumferential movement (rotation) of the first connecting member 20 relative to the mandrel 10.

<Second Connecting Member>

The second connecting member 30 is a cylindrical member that is externally fitted onto and connected to the stepped portion 14 of the mandrel 10. An internal gear formed on the inner peripheral surface of the second connecting member 30 meshes with an external gear formed on the outer peripheral surface of the stepped portion 14 of the mandrel 10. This can regulate a circumferential movement (rotation) of the second connecting member 30 relative to the mandrel 10. In this embodiment, the second connecting member 30 is a metal collar and is fixed to the mandrel 10 by spline connections. The outer diameter of the second connecting member 30 is substantially equal to the outer diameter of the large diameter portion 11 of the mandrel 10 before inflation of the mandrel 10.

<Third Connecting Member>

The third connecting member 40 is a member that is externally fitted onto the small diameter portion of the mandrel 10 and is connected to the second connecting member 30. One axial end portion of the third connecting member 40 is in contact with the boundary between the stepped portion 14 and the small diameter portion 15 of the mandrel 10 as well as the other axial end portion of the second connecting member 30. In this embodiment, the third connecting member 40 is a metal yoke stub that is joined to the second connecting member 30 by laser welding.

<Resin-Containing Fiber Layer>

The resin-containing fiber layer 50 is provided on the large diameter portion 11, the tapered portion 12 and the medium diameter portion 13 of the mandrel 10, the large diameter portion 21 of the first connecting member 20, and the outer peripheral surface of the second connecting member 30. The resin-containing fiber layer 50 includes, as carbon fiber layers, a first carbon fiber layer 51 (see FIG. 4), a second carbon fiber layer 52 (see FIG. 5), and a third carbon fiber layer 53 (see FIG. 6) that are arranged in this order from the radially inner side (from the mandrel 10 side). It should be noted that each of the carbon fiber layers 51, 52, 53 are partly shown in FIGS. 4 to 6. Further, the one axial end portion of the large diameter portion 21 of the first connecting member 20 (the axial end portion of the first connecting member 20 that is located opposite to the mandrel 10) has an outer peripheral surface, and the other axial end portion of the second connecting member 30 (the axial end portion of the second connecting member 30 that is located opposite to the mandrel 10) has an outer peripheral surface; these outer peripheral surfaces are not covered with the resin-containing fiber layer 50 and thus exposed from the resin-containing fiber layer 50.

<First Carbon Fiber Layer>

Figure 4:
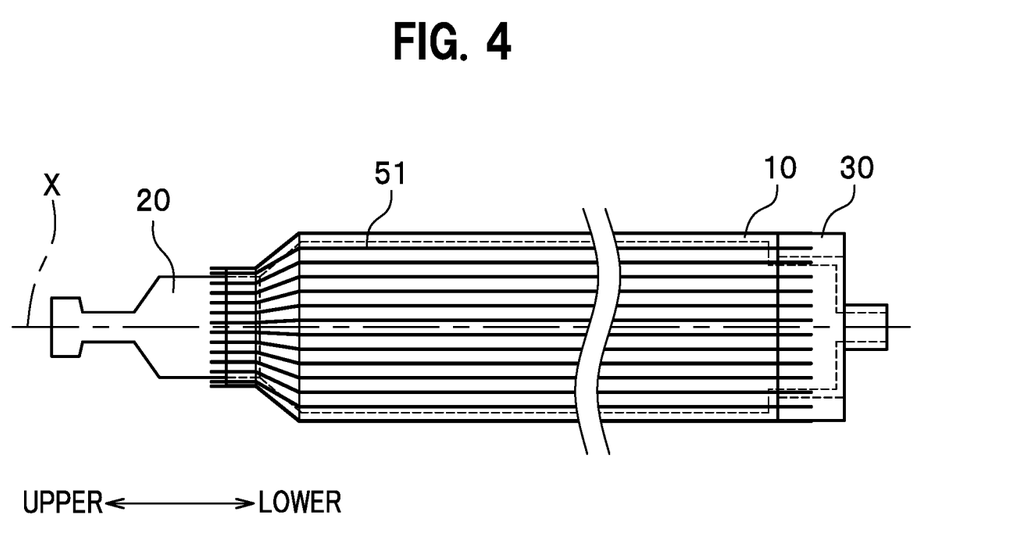
FIG. 4 is a schematic view explaining an arranging step, among steps of the method for manufacturing a tube body made of fiber-reinforced resin according to the first embodiment.

As seen in FIG. 4, the first carbon fiber layer 51 is composed of a plurality of carbon fibers provided around the outer peripheral surfaces of the mandrel 10 and the like to cover the mandrel 10. The carbon fibers in the first carbon fiber layer 51 are extended parallel to the axial direction of the mandrel 10. In other words, in the first carbon fiber layer 51, the orientation angle of the carbon fibers with respect to the axis X of the mandrel 10 is 0°.

<Second Carbon Fiber Layer>

Figure 5:
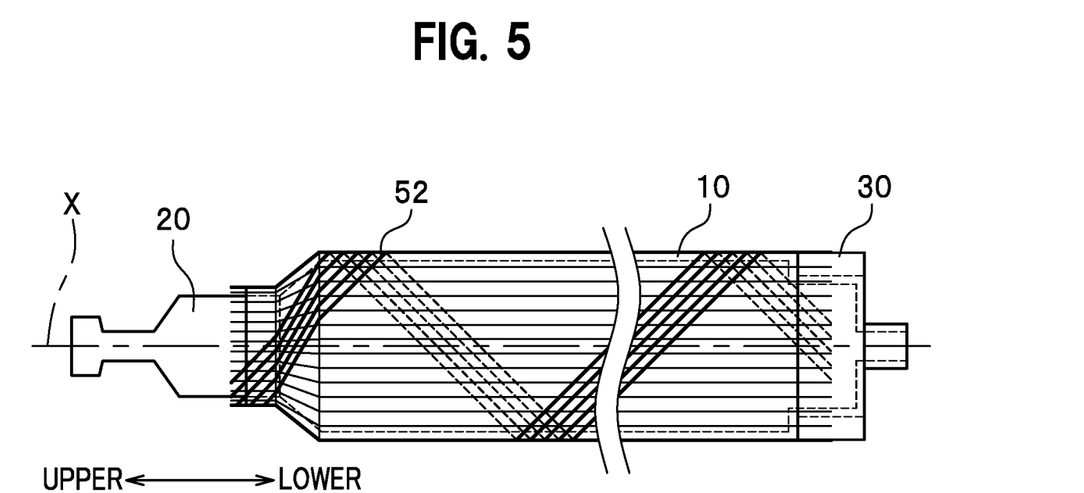
FIG. 5 is a schematic view explaining an arranging step, among steps of the method for manufacturing a tube body made of fiber-reinforced resin according to the first embodiment.

As seen in FIG. 5, the second carbon fiber layer 52 is provided radially outward of the first carbon fiber layer 51. The second carbon fiber layer 52 is composed of a plurality of carbon fibers provided to cover the first carbon fiber layer 51. The carbon fibers in the second carbon fiber layer 52 are inclined at an angle of 45° to the axial direction of the mandrel 10 and wound around the mandrel 10 in excess of one complete spiral turn, so that the carbon fibers extend spirally in the axial direction of the mandrel 10. In other words, in the second carbon fiber layer 52, the orientation angle of the carbon fibers with respect to the axis X of the mandrel 10 is 45° before inflation of the mandrel 10.
<Third Carbon Fiber Layer>

Figure 6:
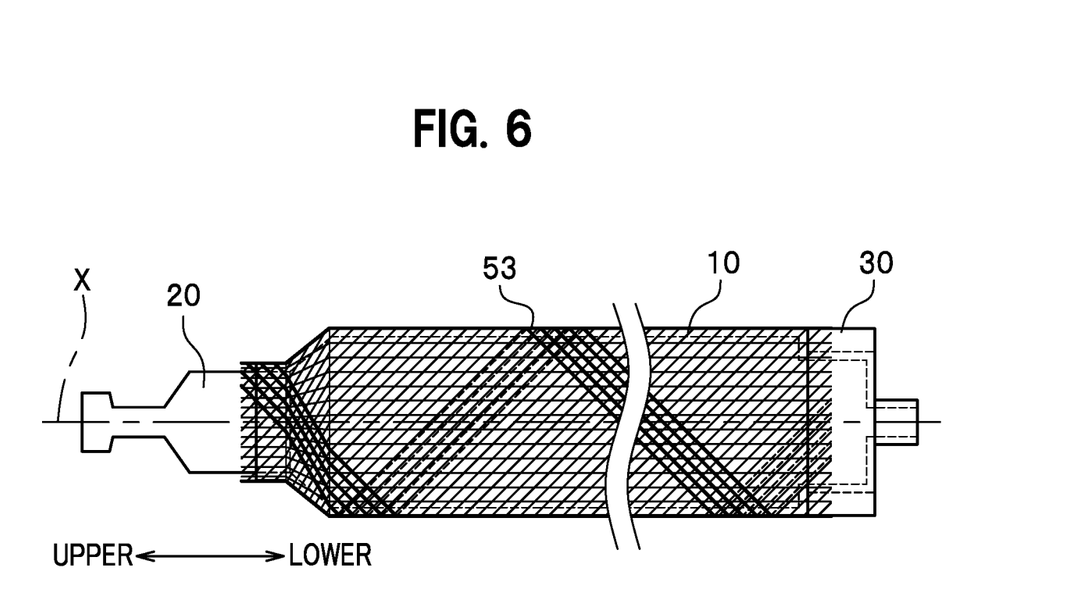
FIG. 6 is a schematic view explaining an arranging step, among steps of the method for manufacturing a tube body made of fiber-reinforced resin according to the first embodiment.

As seen in FIG. 6, the third carbon fiber layer 53 is provided radially outward of the second carbon fiber layer 52. The third carbon fiber layer 53 is composed of a plurality of carbon fibers provided to cover the second carbon fiber layer 52. The carbon fibers in the third carbon fiber layer 53 are inclined at an angle of −45° to the axial direction of the mandrel 10 and wound around the mandrel 10 in excess of one complete spiral turn, so that the carbon fibers extend spirally in the axial direction of the mandrel 10. In other words, in the third carbon fiber layer 53, the orientation angle of the carbon fibers with respect to the axis X of the mandrel 10 is −45° before inflation of the mandrel 10.
<Resin Layer>

As seen in FIG. 1, the resin layer 60A is an annular layer provided on the outer peripheral surface of the large diameter portion 21 of the first connecting member 20. The thickness of the resin layer 60 is substantially equal to the thickness of the resin-containing fiber layer 50. The resin layer 60A covers and protects the exposed portion of the large diameter portion 21 of the first connecting member 20 that is exposed from the resin-containing fiber layer 50.
<Manufacturing Method for Tube Body>

Figure 2:
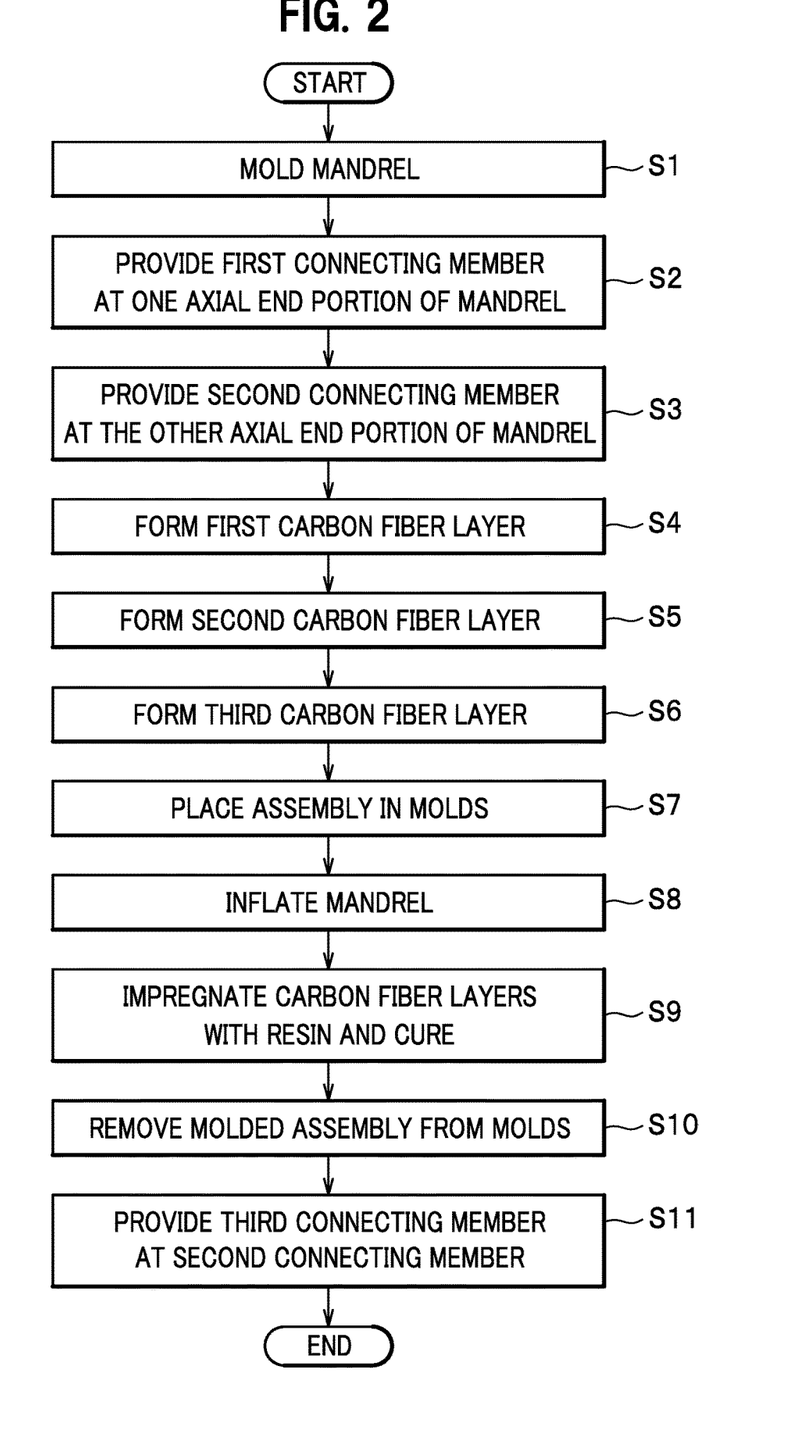
FIG. 2 is a flowchart explaining a method for manufacturing a tube body made of fiber-reinforced resin according to the first embodiment.

Next, a method for manufacturing a tube body 1A according to the first embodiment will be described using the flowchart of FIG. 2.

Figure 3:
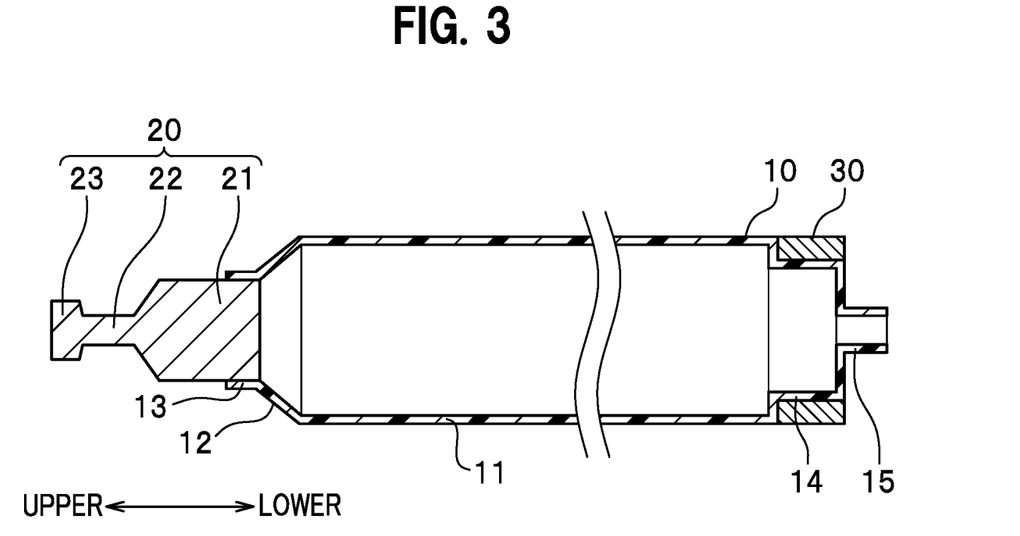
FIG. 3 is a schematic cross-sectional view explaining a mandrel molding step, a first connecting step, and a second connecting step, among steps of the method for manufacturing a tube body made of fiber-reinforced resin according to the first embodiment.

First, as seen in FIG. 3, a mandrel 10 made of resin is molded by a molding apparatus (mold or set of molds) not shown in the drawings (step S1: mandrel molding step). Then, a first connecting member (stub shaft) 20 is provided at one axial end portion of the mandrel 10 (step 2: first connecting step). Next, a second connecting member (collar) 30 is provided at the other axial end portion of the mandrel 10 (step S3: second connecting step). It should be noted that the order of steps S2 and S3 may be changed as needed, and step S3 may be performed first or simultaneously.

Then, as seen in FIG. 4, the first carbon fiber layer 51 is formed on the outer peripheral surface of the mandrel 10, the outer peripheral surface of the large diameter portion 21 of the first connecting member 20, and the outer peripheral surface of the second connecting member 30 by an apparatus (not shown) (step S4: first carbon fiber layer forming step and arranging step). Subsequently, as seen in FIG. 5, the second carbon fiber layer 52 is formed on the outer peripheral surface of the first carbon fiber layer 51 at the mandrel 10, the first connecting member 20, and the second connecting member 30 by the apparatus (not shown) (step S5: second carbon fiber layer forming step and arranging step). Subsequently, as seen in FIG. 6, the third carbon fiber layer 53 is formed on the outer peripheral surface of the second carbon fiber layer 52 at the mandrel 10, the first connecting member 20, and the second connecting member 30 by the apparatus (not shown) (step S6: third carbon fiber layer forming step and arranging step). In steps S4 to S6, the carbon fiber layers 51-53 are formed such that fibers are not arranged on the axial end portions (that are located opposite to the mandrel 10) of the large diameter portion 21 of the first connecting member 20 and the second connecting member 30.

In steps S4 to S6, each of the carbon fiber layers 51-53 are not made of resin-impregnated fibers but are made of so-called filamentous yarns. Further, each of the carbon fiber layers 51-53 is arranged on the outer peripheral surfaces of the mandrel 10 and the large diameter portion 21 of the first connecting member 20 by multiple filament winding method. Each of the carbon fiber layers 51-53 supplied by the multiple filament winding method is independent as a non-interwoven layer having a so-called non-crimp construction.

It should be noted that before the arranging step S4 to S6, a pressurizing step may be provided, in which the interior of the resinous mandrel 10 is pressurized by fluid and the like, so that the arranging step S4 to S6 is performed while pressurizing the interior of the mandrel 10. In this instance, even if the strength of the resinous mandrel 10 is low, it is possible to prevent the mandrel 10 from being damaged by the torque applied when each of the carbon fiber layers 51-53 is provided on the outer peripheral surface of the mandrel 10.

Figure 7:
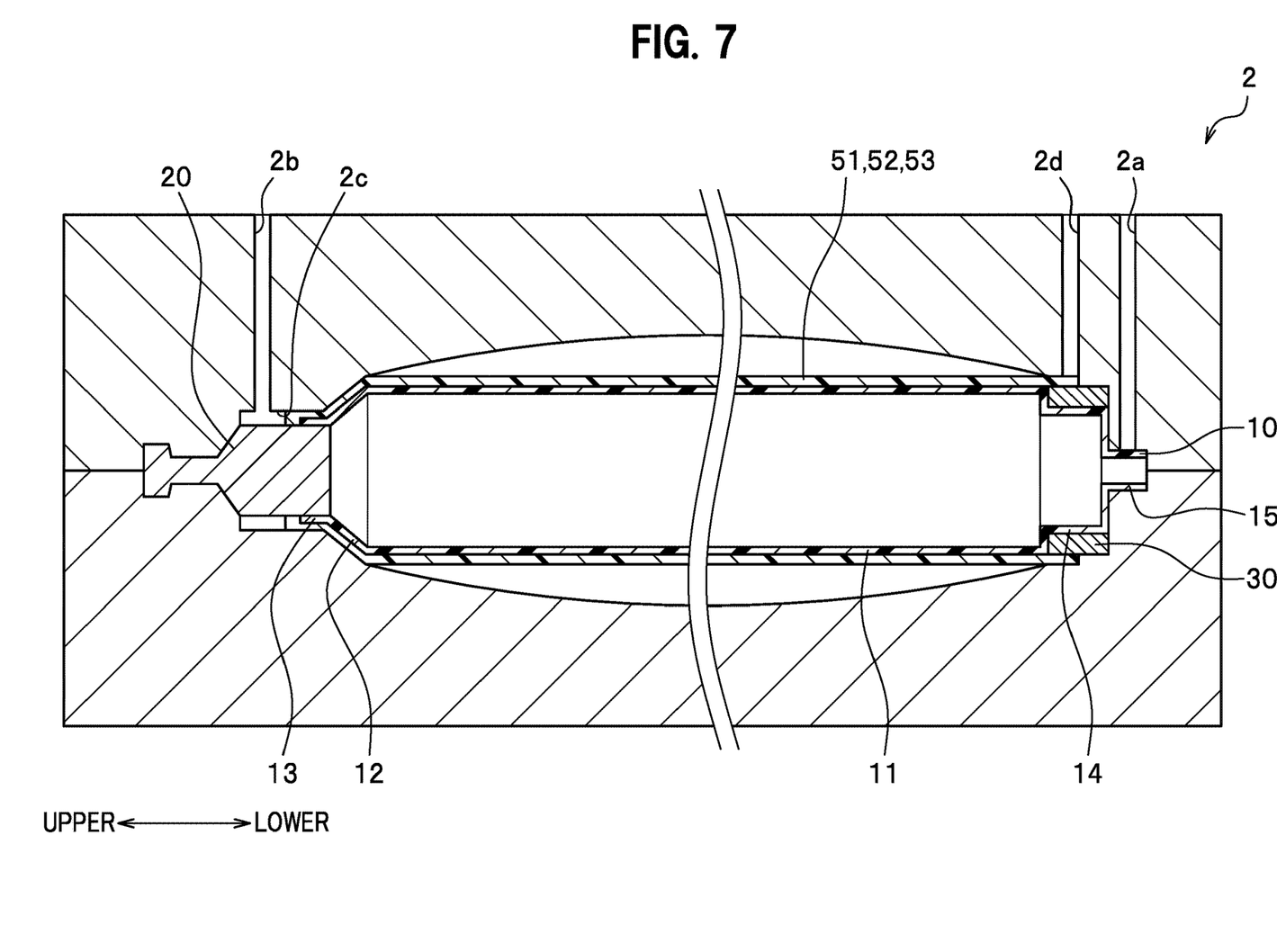
FIG. 7 is a schematic cross-sectional view explaining an in-mold placing step, among steps of the method for manufacturing a tube body made of fiber-reinforced resin according to the first embodiment.

Next, as seen in FIG. 7, the assembly of the mandrel 10, the first connecting member 20, the second connecting member 30, and the carbon fiber layers 51-53 is placed in a molding apparatus (set of molds) 2 (step S7). It should be noted that the inner surface of the molding apparatus (molds) 2 is shaped to have the largest inner diameter at a portion corresponding to the axial middle portion of the large diameter portion 11 of the mandrel 10. In other words, when the molds are closed, the molding apparatus 2 has a portion at which the diameter of the inner peripheral surface is larger than the outer diameter made by the stacked layers of the carbon fiber layers 51-53, and the inner peripheral surface of the molding apparatus 2 has a portion that is spaced apart from the outer peripheral surface of the stacked layers that are formed by the carbon fiber layers 51-53 placed in the molding apparatus 2. This can prevent the carbon fiber layers 51-53 from biting into contact surfaces of the plurality of divided molds.

Figure 8:
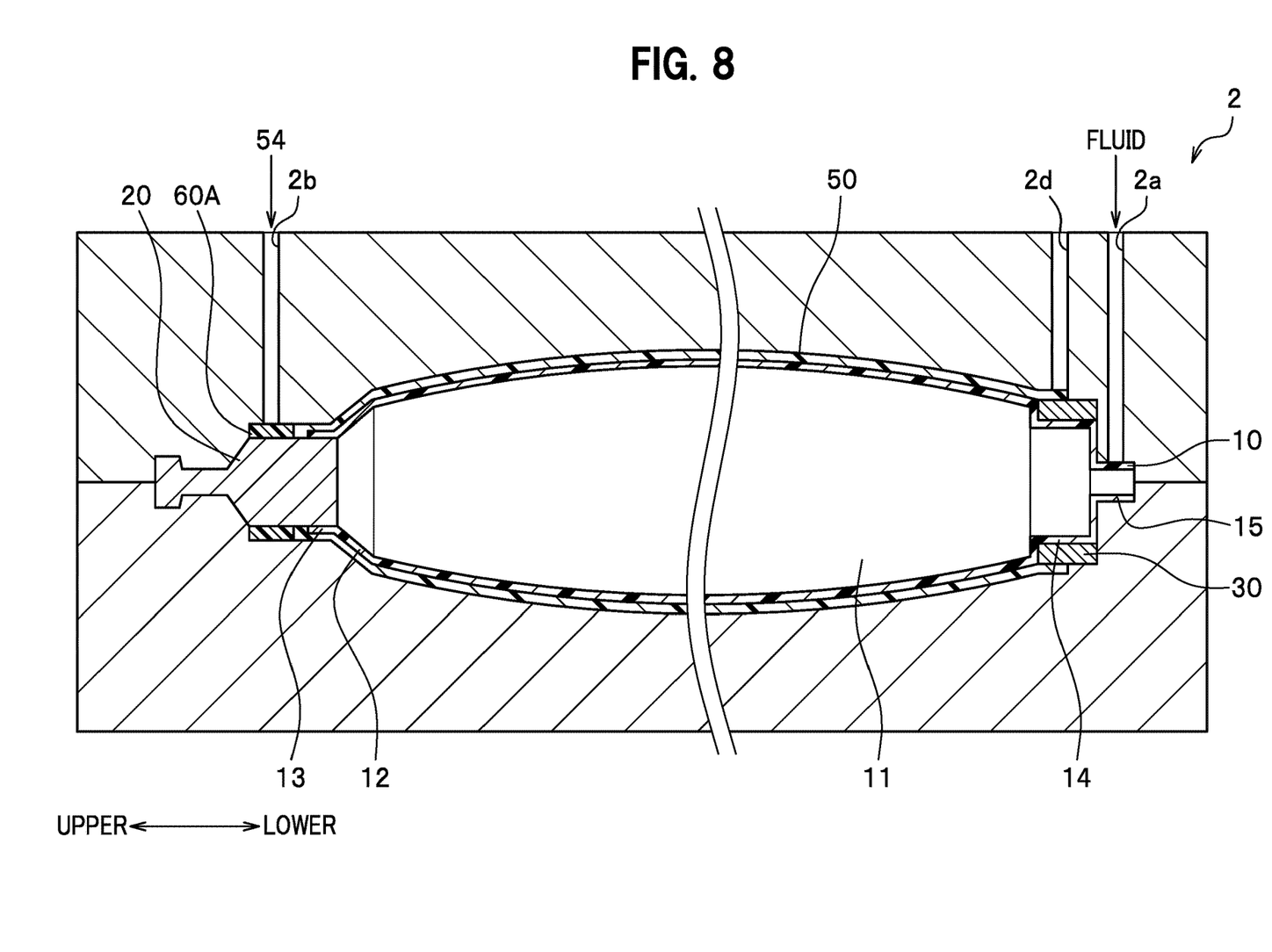
FIG. 8 is a schematic cross-sectional view explaining an inflating step and a resin-impregnating step, among steps of the method for manufacturing a tube body made of fiber-reinforced resin according to the first embodiment.

As seen in FIG. 8, a heated fluid is flowed inside the mandrel 10 of the assembly that is placed in the molding apparatus (molds) 2, so that the interior of the mandrel 10 is pressurized and the large diameter portion 11 of the mandrel 10 is inflated or expanded (step S8: inflating step). The large diameter portion 11 of the mandrel 10 is heated and inflated by the fluid flowing inside the mandrel 10. The third carbon fiber layer 53 is caused to adhere to the inner peripheral surface of the molding apparatus (molds) 2. Accordingly, the assembly is deformed to have a barrel shape in conformity with the inner shape of the molding apparatus (molds) 2. It should be noted that heating of the mandrel 10 using the fluid may be omitted in step S7. Supplying and discharging the fluid into the mandrel 10 can be performed, for example, through a fluid gate 2a formed in the small diameter portion 15 side of the mandrel 10 and an opening formed in the small diameter portion 15.

If the process of pressurizing the interior of the resinous mandrel 10 is performed before the arranging step S4 to S6, the interior of the mandrel 10 may be depressurized after completing the arranging step S4 to S6, and steps S7 and S8 (re-pressurization) may be performed after depressurization. It may also be possible to perform steps S7 and S8 (re-pressurization) after completing the arranging step S4 to S6 without depressurizing the interior of the mandrel 10.

Next, as seen in FIG. 8, resin 54 is supplied into the molding apparatus 2 so that the first carbon fiber layer 51, the second carbon fiber layer 52, and the third carbon fiber layer 53 arranged on the outer peripheral surface of the mandrel 10 are impregnated with the resin 54, and heat is applied to the molding apparatus 2 to cure the resin 54; accordingly, the resin-containing fiber layer 50 and the resin layer 60A are molded (step S9: molding step). For example, the resin 54 is thermosetting resin. In this embodiment, the mold of the molding apparatus 2 is divided into a plurality of molds. In the molding step, heat is applied to the assembly, and after the mold closing operation to close the molds of the molding apparatus 2, further pressure is applied to the closed molds to perform the mold clamping operation, so that the pressure in the molds is increased to thereby promote hardening of the resin 54. In this embodiment, since the mold is divided into a plurality of molds, the mold closing operation and the mold clamping operation are performed. However, it is not always necessary to perform the mold clamping operation. Further, if the mold is not divided into a plurality of molds, it is not always necessary to perform the mold closing operation and the mold clamping operation. In the molding apparatus 2, a gate 2b through which molten resin 54 is introduced has a space (resin pool 2c) at an outlet side thereof. The resin 54 introduced into the molding apparatus 2 is pooled in the resin pool 2c that is located at a side portion of one axial end portions of the fiber layers 51-53. The resin 54 pooled in the resin pool 2c is moved in the axial direction of the mandrel 10 by vacuum suction from a suction port 2d that is formed on the opposite side of the gate 2b across the fiber layers 51-53 arranged in the arrangement direction (i.e., on the outer peripheral surface side of the other axial end portions of the fiber layers 51-53), and each of the carbon fiber layers 51-53 are impregnated with the resin 54. Heat is applied to the molding apparatus 2 and pressure is applied inside the molding apparatus 2 while the carbon fiber layers 51-53 are being impregnated with the resin 54, so that the resin-containing fiber layer 50 is formed and the resin layer 60A is formed in a position corresponding to the resin pool 2c.

The molded assembly that is the molded body is then removed from the molding apparatus 2 (step S10). Subsequently, as seen in FIG. 1, the third connecting member (yoke stub) 40 is attached by laser welding to the end portion of the second connecting member 30 of the molded body that is located axially opposite to the mandrel 10 and that is not covered by the resin-containing fiber layer 50 (step S11: third connecting step).

The method for manufacturing a tube body 1A according to the first embodiment of the present invention comprises: the arranging step S4-S6 of arranging fiber members made of resin (each of the carbon fiber layers 51-53) on the outer peripheral surface of the mandrel 10 by filament winding method; the inflating step S8 of placing the mandrel 10 with the fiber members arranged on it in the molds (molding apparatus 2) after the arranging step S4-S6 and inflating or expanding the mandrel 10 by pressurizing the interior of the mandrel 10 with the fiber members arranged on it; and the molding step S9 of supplying resin 54 in the molds after the inflating step S8 to impregnate the fiber members with the resin and curing the impregnated resin 54 to mold the tube body 1A.

According to this configuration, clearance is ensured when the mandrel 10 on which the fiber members are arranged is placed in the molds, and it is possible to prevent the fiber members from biting into the molds. Further, the inflated (expanded) shape of the mandrel 10 can be suitably adjusted in accordance with the inner shape of the molds, and an increase in the weight of the tube body 1A can be suppressed while preventing an increase in the amount of the resin 54 used in the finished product of the tube body 1A.

Further, according to the method for manufacturing a tube body 1A, after the molding step S9, the mandrel 10A remains as a core material of the tube body 1A.

According to this configuration, an operation required for removing the mandrel 10 can be eliminated, and the mandrel 10 can suitably ensure the the strength and the rigidity of the tube body 1A.

Further, according to the method for manufacturing a tube body 1A, before the arranging step, the method comprises the first connecting step S1 of connecting the first connecting member 20 to one end portion of the mandrel 10, and in the arranging step S4-S6, the fiber members are arranged on the outer peripheral surface of the first connecting member 20.

This configuration allows the first connecting member 20 to be integrally molded into the tube body 1A by performing the molding process, so that the number of manufacturing man-hours can be reduced without the need to provide a press-fitting process of press fitting the first connecting member 20 after molding the tube body 1A. Further, the fiber layer (resin-containing fiber layer 50) impregnated with the resin 54 can strengthen the connection of the first connecting member 20.

Further, according to the method for manufacturing a tube body 1A, the molds (molding apparatus 2) has a space (resin pool 2c) for filling the resin 54 that is injected in the molds, at a connecting portion at which the mandrel 10 and the first connecting member 20 are connected, and the resin 54 filled in the space is sucked in the molding step S9 to impregnate the fiber members with the resin.

According to this configuration, the resin 54 can be suitably impregnated between the fiber members, and it is possible to suitably mold the resin layer 60A with the use of the space to be filled with the resin 54.

Further, according to the method for manufacturing a tube body 1A, in the arranging step S4-S6, the fiber members are arranged by multiple filament winding method.

If the fiber members have a crimp construction, the thickness thereof increases at a position where fiber members are interwoven. In contrast, the plurality of fiber layers 51-53 are made to have a non-crimp construction by this configuration, so that the fiber members arranged can follow the mandrel 10 without interfering with the inflation of the mandrel 10. Further, providing the non-crimp construction makes it possible to reduce the thickness of the resin-containing fiber layer 50, to suppress inhomogeneity of the shapes, and to reduce local stresses. Further, according to this non-crimp construction, gaps between the fiber members can be made uniform and the resin 54 can be suitably impregnated between the fiber members.

Further, according to the method for manufacturing a tube body 1A, before the arranging step S4-S6, the method comprises the second connecting step S3 of connecting the second connecting member 30 to the other end portion of the mandrel 10, and in the arranging step S4-S6, the fiber members are arranged on the outer peripheral surface of the second connecting member 30.

This configuration allows the second connecting member 30 to be integrally molded into the tube body 1A by performing the molding process, so that the number of manufacturing man-hours can be reduced without the need to provide a press-fitting process of press fitting the second connecting member 30 after molding the tube body 1A. Further, the fiber layer (resin-containing fiber layer 50) impregnated with the resin 54 can strengthen the connection of the second connecting member 30.

Further, according to the method for manufacturing a tube body 1A, in the inflating step S8, the interior of the mandrel 10 is pressurized by flowing fluid inside the mandrel 10, and the mandrel 10 and the fiber members are heated by heat of the fluid. This configuration makes it possible to suitably accelerate heating of the resin 54 in the molding step.

Second Embodiment

A tube body and a method for manufacturing a tube body according to a second embodiment will be described with particular reference made to differences from the tube body 1A and the method for manufacturing a tube body 1A according to the first embodiment.

Figure 9:
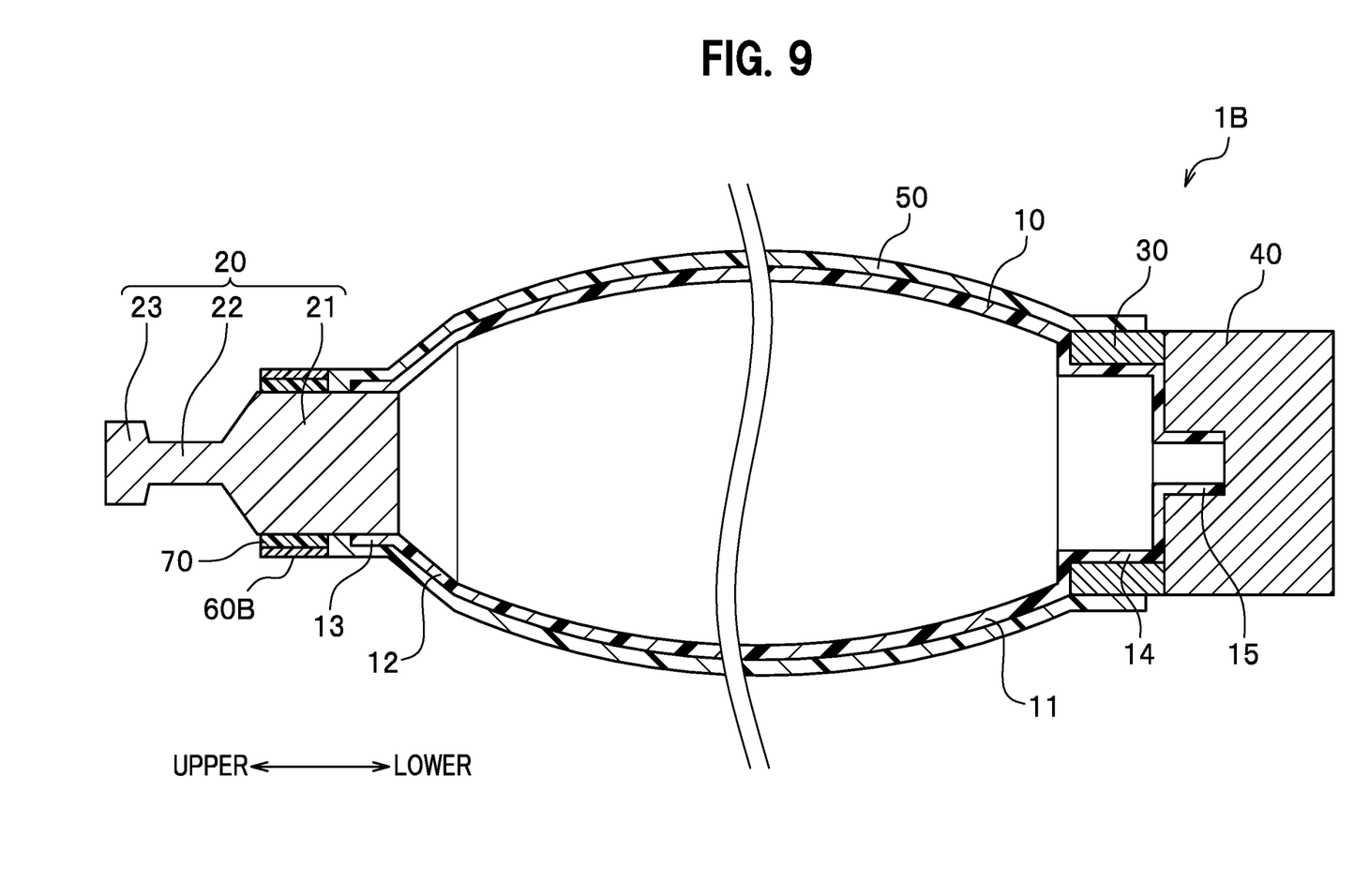
FIG. 9 is a cross-sectional view schematically showing a tube body made of fiber-reinforced resin according to a second embodiment of the present invention.

As seen in FIG. 9, a tube body 1B according to the second embodiment of the present invention includes a resin ring 70 and a resin layer 60B, in place of the resin layer 60A. In other words, the tube body 1B is composed of the resin-containing fiber layer 50, and the resin layer 60B and the resin ring 70. The first connecting member 20, the second connecting member 30, and the third connecting member 40 are connected to the tube body 1B. The mandrel 10 is a core material of the tube body 1B.

<Resin Ring and Resin Layer>

The resin ring 70 is an annular member that is externally fitted onto the outer peripheral surface of the large diameter portion 21 of the first connecting member 20. The resin ring 70 is a fiber-reinforced resinous ring containing reinforcing fibers (e.g., discontinuous carbon fibers, etc.) in the same material as the resin 54. An axial end portion of the resin ring 70 is in contact with the one axial end portion of the resin-containing fiber layer 50. The inner diameter of the resin ring 70 is substantially equal to the outer diameter of the large diameter portion 21 of the first connecting member 20, and the outer diameter of the resin ring 70 is smaller than the outer diameter of the resin-containing fiber layer 50.

The resin layer 60B is an annular layer that is provided on the outer peripheral surface of the resin ring 70. The outer diameter of the resin layer 60B is substantially equal to the outer diameter of the end portion of the resin-containing fiber layer 50, at which the resin-containing fiber layer 50 is in contact with the resin ring 70 and the resin layer 60B.

The resin ring 70 and the resin layer 60B cover and thus protect the portion of the large diameter portion 21 of the first connecting member 20 that is exposed from the resin-containing fiber layer 50.

<Manufacturing Method for Tube Body>

Figure 10:
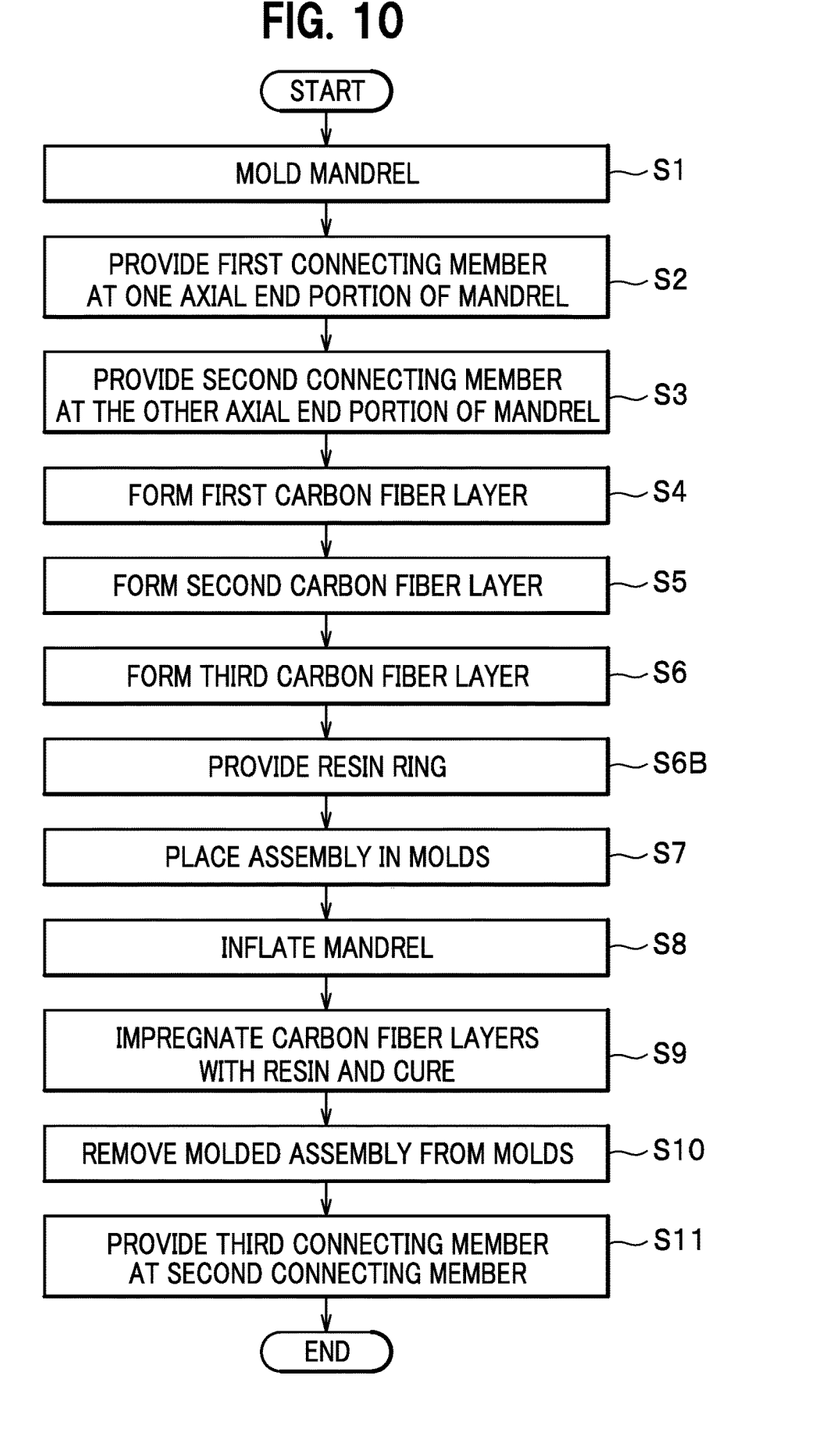
FIG. 10 is a flowchart explaining a method for manufacturing a tube body made of fiber-reinforced resin according to the second embodiment.

Next, a method for manufacturing a tube body 1B according to the second embodiment will be described using the flowchart of FIG. 10.

Between step S6 and step S7, the resin ring 70 is externally fitted onto the portion of the large diameter portion 21 of the first connecting member 20 that is exposed from the carbon fiber layers 51-53 (step S6B: externally fitting step). In step S9, the resin layer 60B is formed to cover the outer peripheral surface of the resin ring 70.

The tube body 1B according to the second embodiment of the present invention includes the mandrel 10 made of resin, the first connecting member 20 connected to one end portion of the mandrel 10, fiber members arranged on the outer peripheral surfaces of the mandrel 10 and the first connecting member 20, the resin ring 70 containing the fiber members and provided on the outer peripheral surface of the first connecting member 20 that is exposed from the fiber members, and the resin 60B impregnated in the fiber members that is arranged on the outer peripheral surfaces of the mandrel 10 and the first connecting member 20 and forming a layer on the outer peripheral surface of the resin ring 70.

According to this configuration, the resin ring 70 mitigates the difference in mold shrinkage ratio between the resin-containing fiber layer 50 and the resin layer 60B, and thus prevents an occurrence of cracking between the resin-containing fiber layer 50 and the resin layer 60B.

Third Embodiment

A method for manufacturing a tube body according to a third embodiment of the present invention will be described with particular reference made to differences from those of the first and second embodiments.

In the third embodiment, the mandrel 10 is maintained in a state in which the axial direction thereof is directed to the vertical direction (so-called vertical layout position) while at least steps S3 to S10 are performed. According to this configuration, displacement of the fiber members can be suitably suppressed even if the orientation angle of the fiber members (especially, the outermost third carbon fiber layer 53) is small.

First Modified Embodiment

Figure 11:
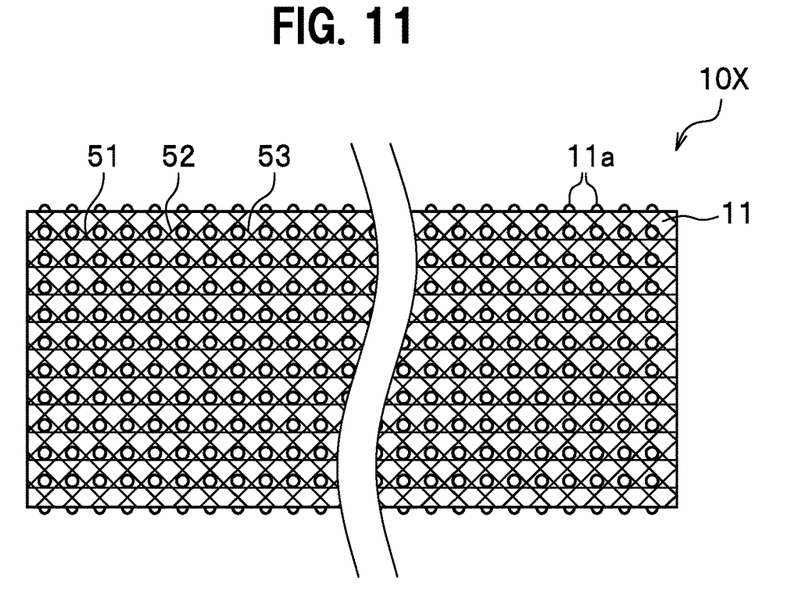
FIG. 11 is a schematic view illustrating a mandrel and a fiber member according to a first modified embodiment of the present invention.

As seen in FIG. 11, a tube body 1X according to the first modified embodiment of the present invention has a plurality of projections 11a formed on the outer peripheral surface of the large diameter portion 11 of the mandrel 10X in the step S1. The mandrel 10X provided with these projections 11a is formed using the molding apparatus (molds) 3 having the corresponding inner shape for manufacturing the mandrel 10X made of resin. In other words, the inner peripheral surface of the molding apparatus 3 used in step S1 has a plurality of recesses 3a corresponding to the projections 11a (see FIG. 12). It is preferable that the height of the projections 11a is equal to or smaller than the total height of the three carbon fiber layers 51-53 but is equal to or greater than the total height of three layers of carbon fiber layers 51-53 at the radial center of the outermost carbon fiber layer 53. This mandrel 10X can prevent each of the carbon fiber layers 51-53 from positionally offsetting at the projections 11a. In other words, in steps S4 to S6, the mandrel 10X provided with the projections 11a allows each of the carbon fiber layers 51-53 to be arranged in an accurate orientation angle, and the orientation angle of each of the carbon fiber layers 51-53 can be maintained at a suitable angle even after inflation of the mandrel 10X.

Figure 12:
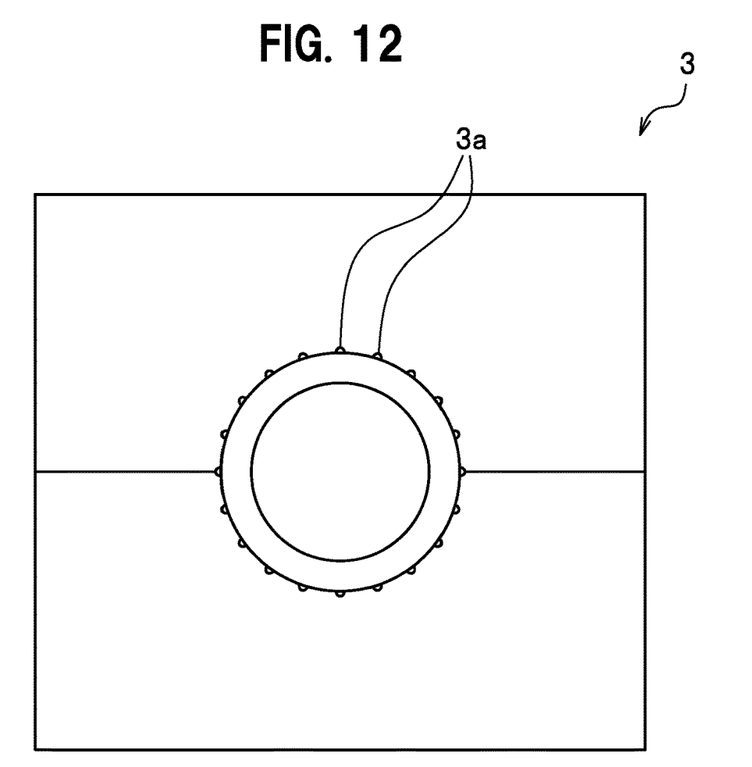
FIG. 12 is a schematic cross-sectional view explaining a mold used in a mandrel molding step, among steps of the method for manufacturing a tube body made of fiber-reinforced resin according to the first modified embodiment.

The method for manufacturing a tube body according to the first modified embodiment of the present invention comprises, before the arranging step S4-S6, a mandrel molding step using the molds (molding apparatus 3) having recesses 3a provided in the inner surface thereof, in which step the mandrel 10X with projections 11a corresponding to the recesses 3a formed on its outer peripheral surface is formed.

According to this configuration, the orientation angle of the fiber members can be maintained at a suitable angle even after inflation of the mandrel 10X.

Second Modified Embodiment

Figure 13:
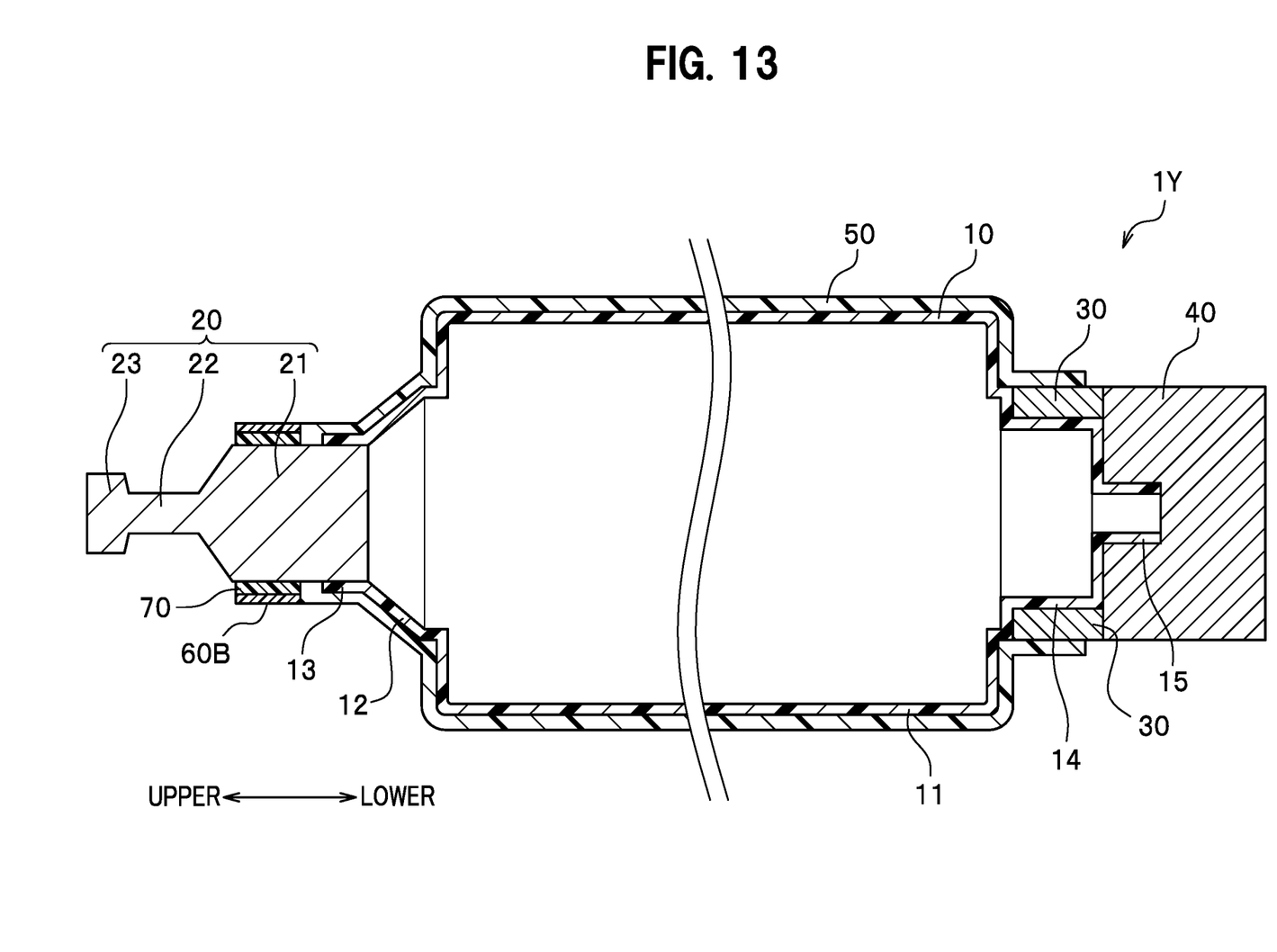
FIG. 13 is a cross-sectional view schematically showing a tube body made of fiber-reinforced resin according to a second modified embodiment of the present invention.
Figure 14:
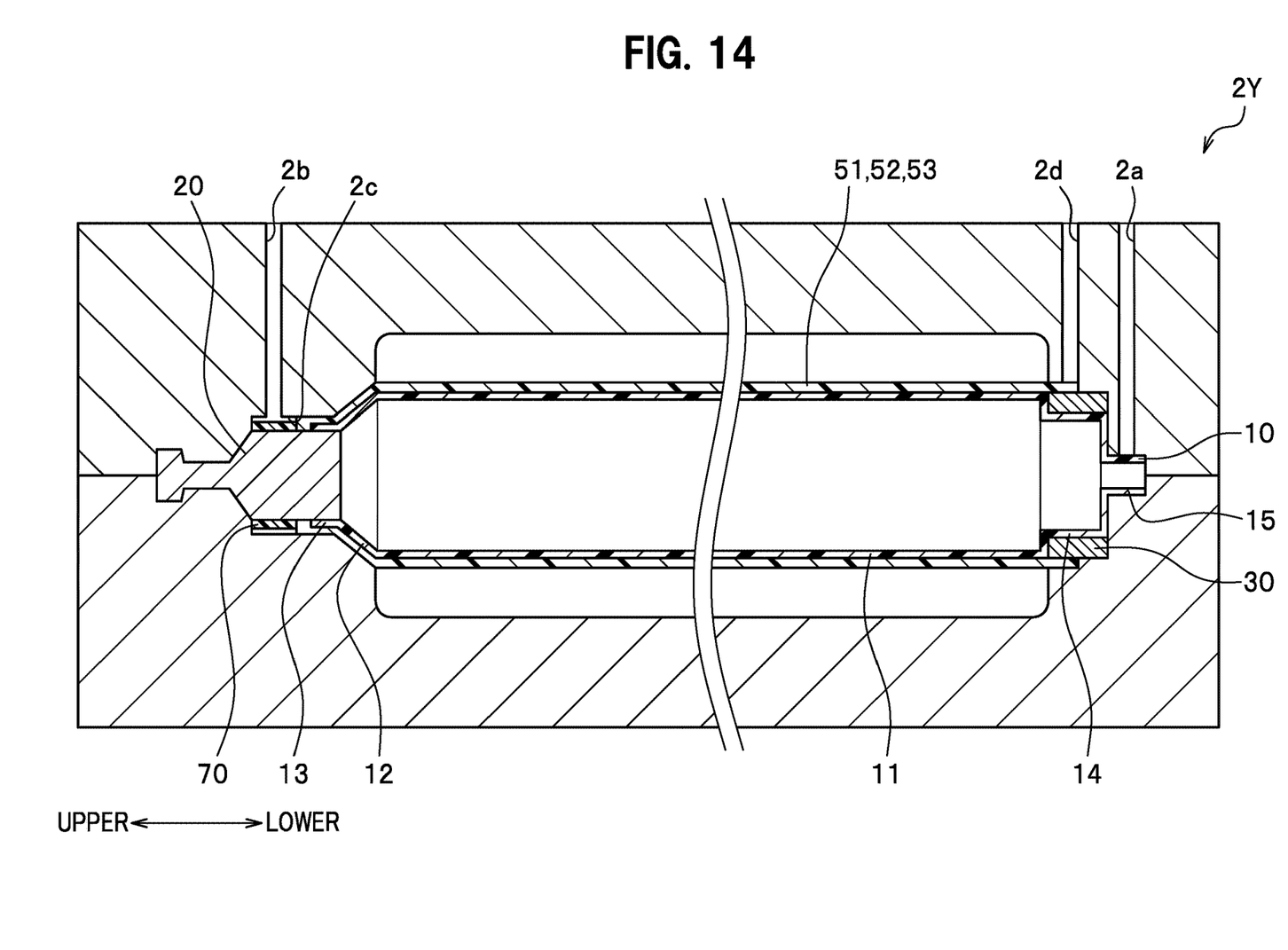
FIG. 14 is a schematic cross-sectional view explaining a mold used in the method for manufacturing a tube body made of fiber-reinforced resin according to the second modified embodiment.

As seen in FIG. 13, a tube body 1Y according to the second modified embodiment of the present invention is configured such that the large diameter portion 11 of the mandrel 10 and the resin-containing fiber layer 50 provided on the outer peripheral surface of the large diameter portion 11 have a cylindrical shape rather than a barrel shape. As seen in FIG. 14, the inner surface of the molding apparatus (molds) 2Y for manufacturing the tube body 1Y has a cylindrical shape larger than the outer diameters of the carbon fiber layers 51-53.

Although the present invention has been described above with reference to some embodiments, the present invention is not limited to these specific embodiments and various changes and modifications may be made without departing from the gist of the present invention. For example, the mandrel 10 may be removed from the molded resin-containing fiber layer 50 between step S9 and step S10. Further, the mandrel 10 may be melt and removed by heat of the fluid applied in step S8 and/or by heat of the resin 54 and/or the molding apparatus (molds) 2 applied in step S9. The mandrel 10 may be melt and removed by another energy source, such as heat, electricity, and vibration.

Further, unheated fluid may be flowed inside the mandrel 10 in step S8, and heated fluid may be flowed inside the mandrel 10 while performing step S9.

Further, each of the carbon fiber layers 51-53 may have a so-called crimp construction, in which they are interwoven with each other.

Further, the fiber members are not limited to carbon fibers, and any fiber materials capable of reinforcing the resin layer (e.g., glass fiber, cellulose fiber) may be used.

What is claimed is:

1. A method for manufacturing a tube body made of fiber-reinforced resin comprising:
   an arranging step of arranging a fiber member on an outer peripheral surface of a tubular member made of resin by filament winding method;
   an inflating step of placing the tubular member with the fiber member arranged on it in a mold after the arranging step and inflating the tubular member by pressurizing an interior of the tubular member with the fiber member arranged on it; and
   a molding step of supplying resin in the mold after the inflating step to impregnate the fiber member arranged on the outer peripheral surface of the tubular member with the resin and curing the impregnated resin to mold a tube body, wherein
   before the arranging step, the method comprises a tubular member molding step using a mold having recesses provided in an inner surface of the mold, in which step the tubular member with projections corresponding to the recesses formed on its outer peripheral surface is formed.

2. The method according to claim 1, wherein
   after the molding step, the tubular member remains as a core material of the tube body.

3. The method according to claim 1, wherein
   before the arranging step, the method comprises a first connecting step of connecting a first connecting member to an end portion of the tubular member, and
   in the arranging step, the fiber member is arranged on an outer peripheral surface of the first connecting member.

4. The method according to claim 3, wherein
   the mold has a space for filling the resin that is injected in the mold, at a connecting portion at which the tubular member and the first connecting member are connected, and
   the resin filled in the space is sucked in the molding step to impregnate the fiber member with the resin.

5. The method according to claim 1, wherein
   in the arranging step, the fiber member is arranged by multiple filament winding method.

6. The method according to claim 1, wherein
   before the arranging step, the method comprises a second connecting step of connecting a second connecting member to another end portion of the tubular member, and
   in the arranging step, the fiber member is arranged on an outer peripheral surface of the second connecting member.

7. The method according to claim 1, wherein
   in the inflating step, an interior of the tubular member is pressurized by flowing fluid inside the tubular member, and
   the tubular member and the fiber member are heated by heat of the fluid.

8. The method according to claim 1, wherein
   the fiber member arranged in the arranging step has a non-crimp construction.

9. The method according to claim 2, wherein
   before the arranging step, the method comprises a first connecting step of connecting a first connecting member to an end portion of the tubular member, and
   in the arranging step, the fiber member is arranged on an outer peripheral surface of the first connecting member.

10. The method according to claim 2, wherein
    in the arranging step, the fiber member is arranged by multiple filament winding method.

11. The method according to claim 3, wherein
    in the arranging step, the fiber member is arranged by multiple filament winding method.

12. The method according to claim 3, wherein
    before the arranging step, the method comprises a second connecting step of connecting a second connecting member to another end portion of the tubular member, and
    in the arranging step, the fiber member is arranged on an outer peripheral surface of the second connecting member.

13. The method according to claim 3, wherein
    in the inflating step, an interior of the tubular member is pressurized by flowing fluid inside the tubular member, and
    the tubular member and the fiber member are heated by heat of the fluid.

14. The method according to claim 3, wherein
    the fiber member arranged in the arranging step has a non-crimp construction.

15. The method according to claim 1, wherein the tubular member is a mandrel.

16. A method for manufacturing a tube body made of fiber-reinforced resin comprising:
    an arranging step of arranging a fiber member on an outer peripheral surface of a tubular member made of resin by filament winding method;
    an inflating step of placing the tubular member with the fiber member arranged on it in a mold after the arranging step and inflating the tubular member by pressurizing an interior of the tubular member with the fiber member arranged on it; and
    a molding step of supplying resin in the mold after the inflating step to impregnate the fiber member arranged on the outer peripheral surface of the tubular member with the resin and curing the impregnated resin to mold a tube body, wherein
    after the molding step, the tubular member remains as a core material of the tube body, and
    before the arranging step, the method comprises a tubular member molding step using a mold having recesses provided in an inner surface of the mold, in which step the tubular member with projections corresponding to the recesses formed on its outer peripheral surface is formed.

17. The method according to claim 16, wherein
before the arranging step, the method comprises a second connecting step of connecting a second connecting member to another end portion of the tubular member, and
in the arranging step, the fiber member is arranged on an outer peripheral surface of the second connecting member.

18. The method according to claim 16, wherein
in the inflating step, an interior of the tubular member is pressurized by flowing fluid inside the tubular member, and
the tubular member and the fiber member are heated by heat of the fluid.

19. The method according to claim 16, wherein
the fiber member arranged in the arranging step has a non-crimp construction.

\* \* \* \* \*